(12) United States Patent
Ghosh et al.

(10) Patent No.: US 12,246,390 B2
(45) Date of Patent: Mar. 11, 2025

(54) FRICTION STIR WELDING TOOL INSERT

(71) Applicant: Element Six (UK) Limited, Oxfordshire (GB)

(72) Inventors: Santonu Ghosh, Oxfordshire (GB); Stig Åke Andersin, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 0 days.

(21) Appl. No.: 18/043,375

(22) PCT Filed: Sep. 1, 2021

(86) PCT No.: PCT/EP2021/074114
§ 371 (c)(1),
(2) Date: Feb. 28, 2023

(87) PCT Pub. No.: WO2022/049113
PCT Pub. Date: Mar. 10, 2022

(65) Prior Publication Data
US 2023/0311240 A1    Oct. 5, 2023

(30) Foreign Application Priority Data
Sep. 1, 2020    (GB) ...................................... 2013686

(51) Int. Cl.
*B23K 20/12*    (2006.01)
(52) U.S. Cl.
CPC ................ *B23K 20/1255* (2013.01)
(58) Field of Classification Search
CPC ............................................... B23K 20/1255
See application file for complete search history.

(56) References Cited

U.S. PATENT DOCUMENTS

| | | | | |
|---|---|---|---|---|
| 6,138,895 A * | 10/2000 | Oelgoetz | ............ | B23K 20/125 228/2.1 |
| 7,530,486 B2 * | 5/2009 | Flak | .................. | B23K 20/1255 228/112.1 |
| 8,241,556 B2 * | 8/2012 | Rosal | ................ | B23K 20/1255 228/112.1 |

(Continued)

FOREIGN PATENT DOCUMENTS

| CN | 2776617 Y | 5/2006 |
|---|---|---|
| CN | 105312761 A | 2/2016 |

(Continued)

OTHER PUBLICATIONS

Combined Search and Examination Report issued for GB2013686.7, dated Jan. 27, 2021 (7 pages).

(Continued)

*Primary Examiner* — Erin B Saad
*Assistant Examiner* — Carlos J Gamino
(74) *Attorney, Agent, or Firm* — Armstrong Teasdale LLP

(57) ABSTRACT

This disclosure relates to a two-piece friction stir welding (FSW) tool insert. The tool insert has a longitudinal axis of rotation and comprises a stirring pin and an annular shoulder coaxially mounted about the stirring pin. The stirring pin and annular shoulder each comprise polycrystalline cubic boron nitride. The annular shoulder is a thin disc with a thickness of 1 to 12 mm and the shoulder comprises a tapered, central aperture, through which the stirring pin protrudes.

18 Claims, 11 Drawing Sheets

(56) References Cited

U.S. PATENT DOCUMENTS

| | | | | |
|---|---|---|---|---|
| 8,910,851 | B2* | 12/2014 | Rosal | B23K 20/26 |
| | | | | 228/2.1 |
| 2005/0249978 | A1* | 11/2005 | Yao | C04B 35/645 |
| | | | | 428/704 |
| 2006/0169740 | A1* | 8/2006 | Fukuhara | B23K 20/1265 |
| | | | | 228/2.1 |
| 2006/0169747 | A1* | 8/2006 | Tolle | B23K 20/1255 |
| | | | | 228/112.1 |
| 2006/0175382 | A1* | 8/2006 | Packer | B23K 20/1255 |
| | | | | 228/2.1 |
| 2007/0119276 | A1 | 5/2007 | Liu | |
| 2009/0272788 | A1* | 11/2009 | Fukushima | B23K 20/1245 |
| | | | | 228/2.1 |
| 2011/0274943 | A1* | 11/2011 | Fujii | B23K 20/1255 |
| | | | | 228/2.1 |
| 2013/0062395 | A1* | 3/2013 | Nelson | B23K 20/122 |
| | | | | 228/2.1 |
| 2016/0199934 | A1* | 7/2016 | Maruko | B23K 20/1255 |
| | | | | 228/2.3 |
| 2017/0274472 | A1* | 9/2017 | Maruko | B23K 20/1255 |
| 2019/0076957 | A1 | 3/2019 | Severson et al. | |
| 2021/0402505 | A1* | 12/2021 | Choi | B23K 20/128 |
| 2022/0364209 | A1* | 11/2022 | Ghosh | C22C 26/00 |
| 2023/0096628 | A1* | 3/2023 | Figner | B23K 20/129 |
| | | | | 228/112.1 |
| 2024/0009755 | A1* | 1/2024 | Ghosh | B23K 20/1255 |
| 2024/0009756 | A1* | 1/2024 | Ghosh | B23K 20/1255 |

FOREIGN PATENT DOCUMENTS

| | | |
|---|---|---|
| CN | 107598357 A | 1/2018 |
| CN | 108115263 A | 6/2018 |
| EP | 2551049 A1 | 1/2013 |
| JP | 2006224180 A | 8/2006 |
| JP | 2008036664 A | 2/2008 |
| JP | 2013031863 A | 2/2013 |
| JP | 2013094790 A | 5/2013 |
| JP | 2015039704 A | 3/2015 |
| JP | 2016150356 A | 8/2016 |
| KR | 20110088266 A | 8/2011 |
| KR | 20130061677 A | 6/2013 |
| KR | 101987064 B1 | 6/2019 |
| KR | 20200083327 A | 7/2020 |
| WO | 0185385 A1 | 11/2001 |
| WO | 201074165 A1 | 7/2010 |
| WO | 2016163214 A1 | 10/2016 |

OTHER PUBLICATIONS

Combined Search and Examination Report issued for GB2112436.7, dated Feb. 17, 2022 (8 pages).

International Search Report and Written Opinion issued for PCT/EP2021/074114, dated Jan. 21, 2022 (14 pages).

* cited by examiner

FRICTION STIR WELDING TOOL INSERT

CROSS-REFERENCE TO RELATED APPLICATIONS

This application is the § 371 national stage of International Application No. PCT/EP2021/074114, filed Sep. 1, 2021, which claims priority to Great Britain Patent Application No. 2013686.7, filed Sep. 1, 2020.

FIELD OF THE INVENTION

This disclosure relates to a two-part friction stir welding (FSW) tool insert comprising a stirring pin and a shoulder that are detachable from one another. The disclosure further relates to a tool assembly comprising a tool holder and the tool insert.

BACKGROUND

Friction stir welding (FSW) is a technique whereby a rotating tool is brought into forcible contact with two adjacent workpieces to be joined and the rotation of the tool creates frictional and viscous heating of the workpieces. Extensive deformation as mixing occurs along a plastic zone. Upon cooling of the plastic zone, the workpieces are joined along a welding joint. Since the workpiece remains in the solid phase this process is technically a forging process rather than a welding process, none the less by convention, it is referred to as welding or friction stir welding and that convention is followed here.

In the case of FSW in low temperature metals, the whole tool/tool holder can be a single piece of shaped tool steel, in which case it is often referred to as a 'probe'. By contrast and as in the case here where the tool is for welding higher temperature alloys such as steel, the tool is often in two or more parts. The tool has an end element that is in direct contact with the material being welded, often referred to as a 'puck' or 'tool insert', and the remainder of the tool is referred to as the 'tool holder'. The tool holder holds the puck securely and fits into the FSW machine. The tool puck and tool holder together make up the 'tool' or 'tool assembly'. The tool puck is typically shaped to form a shoulder and a stirring pin, often with a reverse spiral cut into the surface of the stirring pin so that during rotation it pulls metal towards the pin and pushes the metal down into the hole being formed by the pin.

The pin length is typically 95% of the intended depth of the weld, for example, for a full thickness butt weld with no root flaw in 6 mm thick steel, the pin length is 5.7 mm. One of the key challenges in FSW operations is welding plate workpieces over 12 mm thick. With increased plate thickness, it can be difficult to achieve the required pin length.

US 2006/0169747 discloses a friction stir welding tool with a shank portion, a shoulder portion which is releaseably engageable with the shank portion, and a pin which is releasably engageable with the shank portion. The shank portion 11, shoulder portion 50 and pin 90 are fabricated from a metal or metal alloy which is selected from the group comprising high temperature refractory metals such as tungsten, molybdenum, rhenium and their alloys, ceramics such as boron nitride and related compounds; and tungsten and their related carbides. A disadvantage of the construction described therein is the volume of material required to produce the FSW tool whilst minimising costs and maximising life span.

Tool pucks made from polycrystalline cubic boron nitride (PCBN), such as the one described in the Applicant's co-pending application GB1917907.6, are relatively cost effective and highly durable. However, a limitation of the manufacturing process of such PCBN pucks is that a bulk PCBN piece is required, out of which the puck is fashioned. Monolithic PCBN blocks need to be as high as 50 mm in diameter and 50 mm in height, in order to produce a puck with a 12 mm pin height, which will be capable of welding a 12 mm plate thickness. Monolithic PCBN blocks (and therefore PCBN pucks) larger than this are currently not feasible due to the limitations of the High Pressure High Temperature (HPHT) presses used during the PCBN sintering process. A larger press may compromise the material homogeneity. In short, the size of a PCBN puck currently achievable in practice is limited to being capable of welding plates with thickness 12 mm or below.

It is an object of this invention to provide a FSW puck capable of welding a plate thickness higher than 12 mm, which is cost effective and durable.

SUMMARY OF THE INVENTION

In a first aspect of the invention, there is provided a friction stir welding (FSW) tool insert having a longitudinal axis of rotation, said tool insert comprising a stirring pin and an annular shoulder coaxially mounted about the stirring pin, the stirring pin and annular shoulder each comprising polycrystalline cubic boron nitride, wherein the annular shoulder is a thin disc with a thickness of 1 to 12 mm and wherein the shoulder comprises a tapered, central aperture, through which the stirring pin protrudes.

Optionally, the disc has a thickness of 2 to 12 mm. Preferably, the thickness of the disc is 3 to 12 mm. More preferably, the thickness of the disc is 4 to 12 mm.

The shoulder may comprise a carbide carrier. Alternatively, the shoulder may be unbacked, i.e. devoid of any carrier.

Preferably, the shoulder comprises at least one spiral feature on a planar upper surface, the upper surface being proximate to the stirring pin.

Optionally, the shoulder has an outer radius of 4.5 mm to 75 mm.

Optionally, the shoulder further comprises a flange.

Preferably, the stirring pin comprises a conical first pin portion extending away from a second pin portion at a boundary, towards an apex.

Optionally, the stirring pin further comprising stir inducing topographical features provided in or on the first pin portion and/or the second pin portion. Preferably, the stir inducing topographical features are spirals and/or flats.

Optionally, the second pin portion comprises an outwardly tapering waist section proximate the boundary, the waist section extending into an outwardly tapering middle section, the middle section extending into an inwardly tapering base section.

Optionally, the second pin portion has an outer diameter of up to 50 mm. Optionally, the second pin portion has an outer diameter of 25 mm to 50 mm.

In a second aspect of the invention, there is provided a tool assembly comprising a tool holder and a FSW tool insert in accordance with the first aspect of the invention, the tool holder comprises a holding member for receiving the tool insert, and an elongate trunk member joined to the holding member.

Optionally, the holding member comprises a recessed cup to receive the tool insert.

Optionally, the holding member is configured to receive only the base section of the stirring pin within the recessed cup.

Optionally, a lower planar surface of the shoulder abuts the tool holder in an assembled condition.

Optionally, an inner circular surface of the shoulder abuts the waist section of the stirring pin in an assembled condition.

Preferably, the tool holder comprises a nickel-based alloy. Preferably the nickel-based alloy is Nimonic® 80A alloy or similar. Nimonic® 80A alloy is a nickel-chromium based alloy and contains additions of titanium, aluminium and carbon.

Optionally, the tool holder further comprises a retaining nut mounted about the shoulder and the tool holder.

Optionally, the tool holder further comprises a set of cooperating locking elements to prevent relative rotation between the shoulder and the tool holder. Preferably, Optionally, the tool holder comprises a plurality of sets of cooperating locking elements.

BRIEF DESCRIPTION OF THE DRAWING

The invention will now be more particularly described, by way of example only, with reference to the accompanying drawings, in which.

DETAILED DESCRIPTION OF THE DRAWINGS

Figure 1:
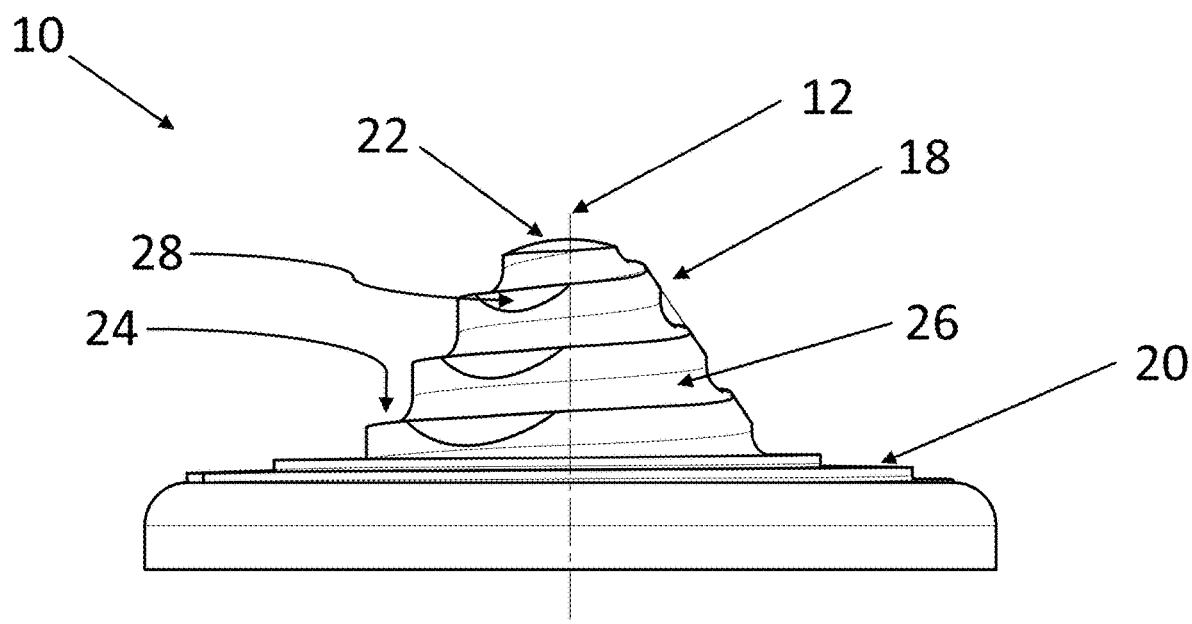
FIG. 1 shows a partial side view of a prior art friction stir welding tool.
Figure 2:
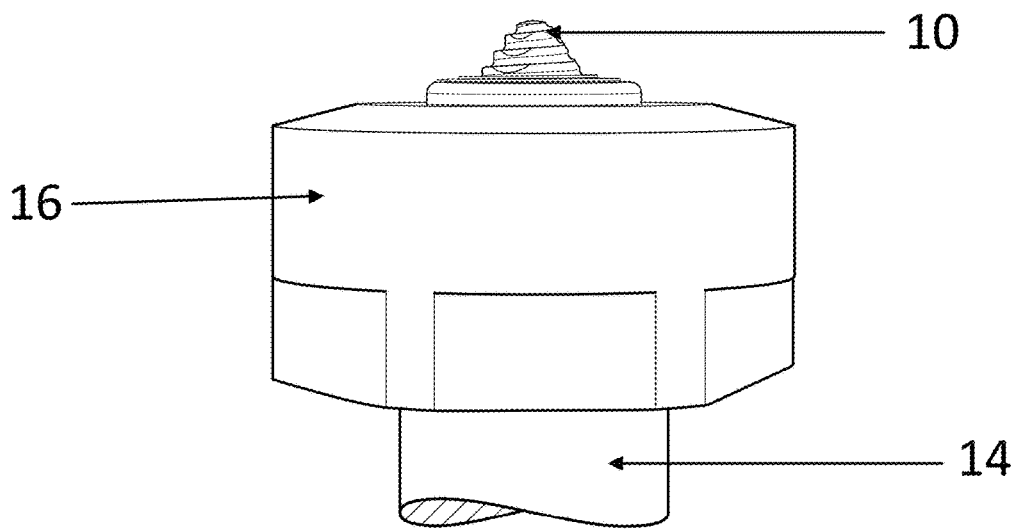
FIG. 2 shows a side view of a prior art tool assembly comprising the tool of FIG. 1, a tool holder and a locking collar securing the tool to the tool holder.
Figure 3:
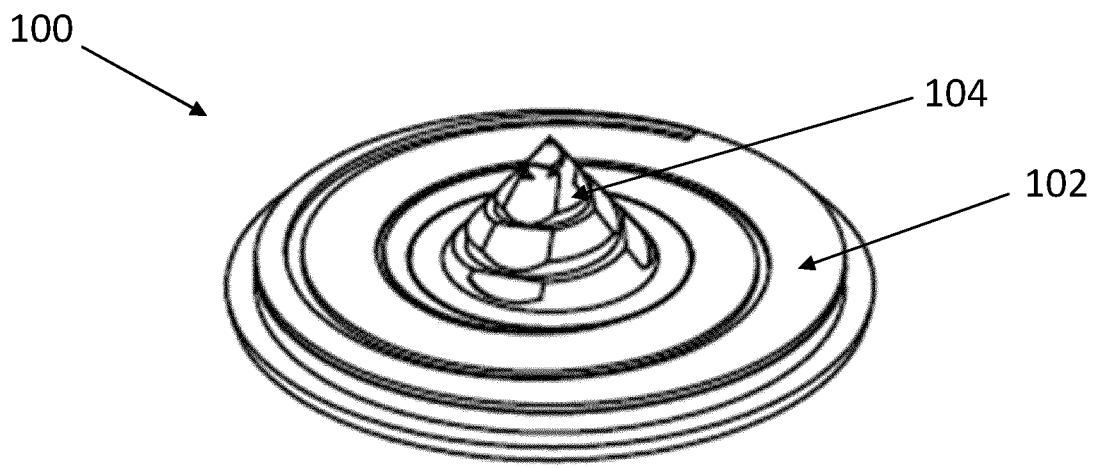
FIG. 3 shows a perspective view of a tool insert in accordance with the invention, the tool insert comprising a stirring pin and a shoulder.
Figure 4:
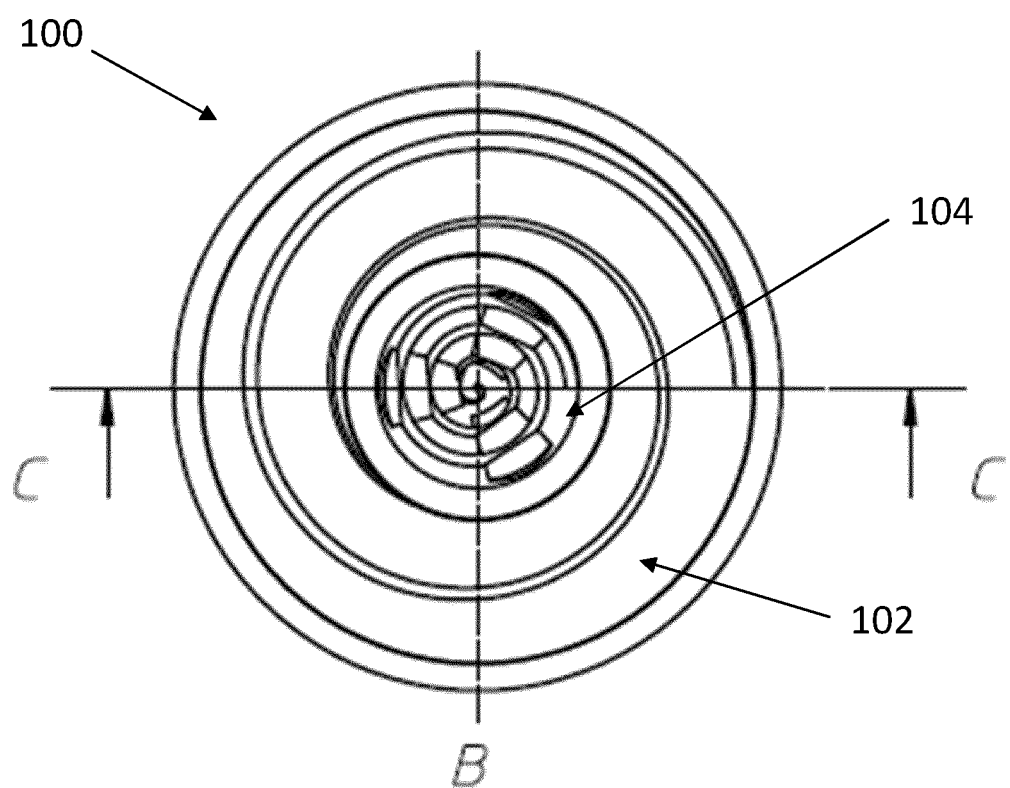
FIG. 4 shows a plan view of the tool insert of FIG. 3.
Figure 5:
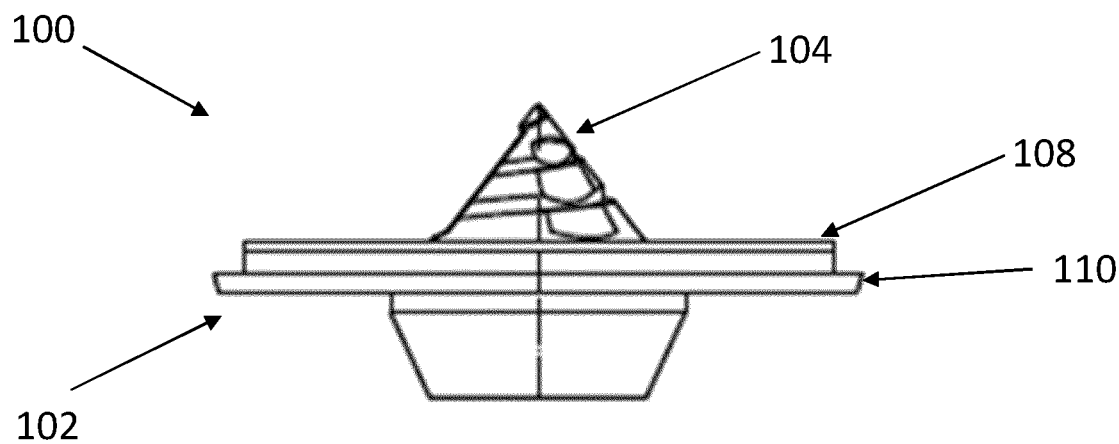
FIG. 5 shows a side view of the tool insert of FIG. 3.
Figure 6:
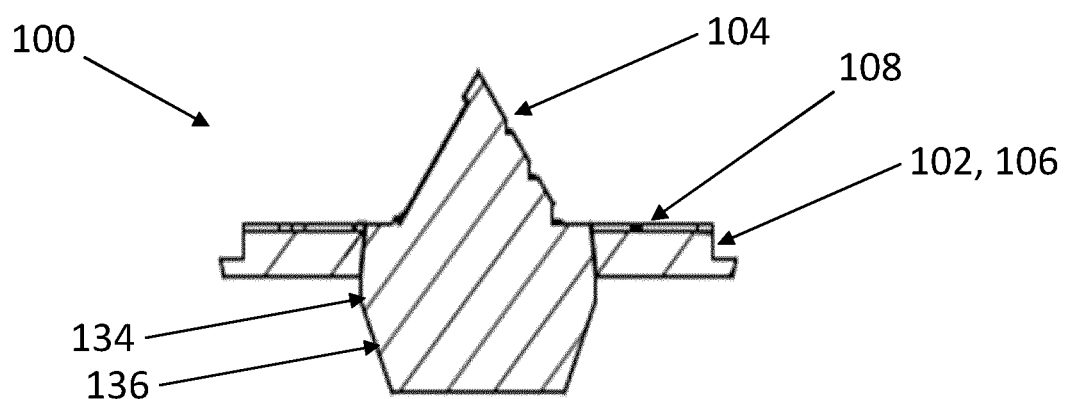
FIG. 6 shows a cross-sectional view through section C-C shown in FIG. 4.

Referring to FIGS. 1 and 2, a prior art FSW tool insert is indicated generally at 10. The tool insert 10 has an axis of rotation 12 about which it rotates during FSW. (Note that this axis of rotation is not an axis of rotational symmetry, largely because of the asymmetric thread pattern machined into the tool insert.) In use, the tool insert 10 is shrunk fit into a tool holder 14. A locking collar 16 secures the tool insert 10 in place on the tool holder 14.

The tool insert 10 comprises a stirring pin 18, a shoulder 20 and a body portion (not shown), all in axial alignment with each other. The stirring pin 18, shoulder 20 and body portion are all integrally formed with each other. This one-piece tool insert is limited to welding plates having a thickness of 12 mm or less.

The stirring pin 18 extends from a rounded apex 22 to the shoulder 20. The shoulder 20 is substantially cylindrical and has a larger diameter than a circular base of the stirring pin 18. The stirring pin 18 has an inscribed spiral feature running from the apex 22 down to the shoulder 20. As such, the stirring pin 18 is generally conical in profile. The spiral has a planar pathway 24, which faces axially. The working surface 26 of the tool insert 10 faces radially. Several tri-flats 28 are provided in the spiral. Each tri-flat 28 is an edge chamfer of the planar pathway 24. The shoulder 20 extends axially to meet the body portion. The body portion is configured to couple with the tool holder 14.

In use, rotation of the tool is such that the spiral drives workpiece material flow from the edge of the shoulder 20 to the centre and then down the length of the stirring pin 18, forcing workpiece material to circulate within the stirred zone and to fill the void formed by the pin as the tool traverses. Such circulation is understood to promote homogeneous microstructure in the resulting weld.

Turning now to FIGS. 3 to 6, an embodiment of a two-piece tool insert in accordance with the invention is indicated generally at 100. The tool insert 100 comprises a shoulder 102 mounted coaxially about a stirring pin 104. The axis being referred to is the axis of rotation, as per the earlier comments.

The stirring pin and shoulder are shrunk fit together, after having been manufactured separately and assembled, thereby forming the tool insert. Not being monolithic, the materials used for the shoulder and the stirring pin can be different to one another. This is useful because the two components experience different stress and temperature conditions during use. Thus, they require difference material properties and structural features, and their design can be altered accordingly. Similarly, friction requirements for the two components vary too. For a tool insert manufactured from polycrystalline cubic boron nitride (PCBN), a two-piece arrangement is particularly useful because it means that the stirring pin can be made from a first block of PCBN and the shoulder from a second block of PCBN, rather than making both components from a single super-sized block, much of which would be excess to requirements. A shrink fit is particularly important for PCBN components; steel components would require a different form of co-operation.

Figure 7:
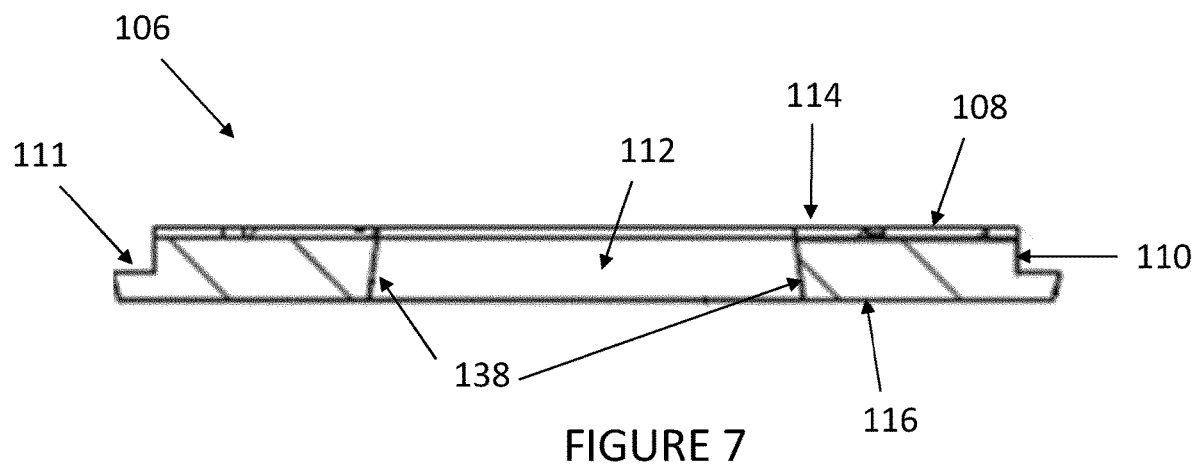
FIG. 7 shows a cross-sectional view of the shoulder of FIG. 3.
Figure 8:
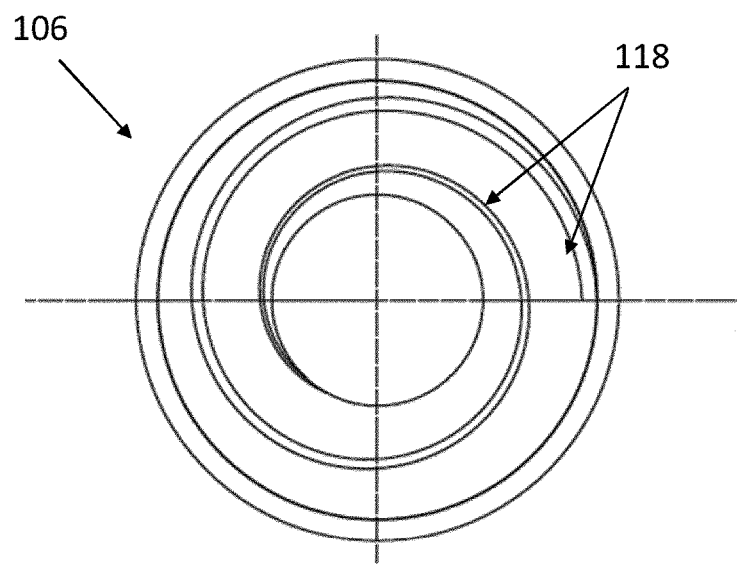
FIG. 8 shows a plan view of the shoulder of FIG. 7.

As best seen in FIGS. 7 and 8, the shoulder 102 comprises an annular disc 106 with a thickness of 1 mm to 12 mm, preferably 2 to 12 mm, more preferably 3 to 12 mm, and yet more preferably 4 to 12 mm. The annular disc 106 comprises a PCBN layer 108 backed with a carbide substrate 110, usually referred to as a 'carrier'. The carrier 110 is optional and may be omitted, typically depending on the thickness of the PCBN layer, as a free-standing PCBN annular disc could be used instead. The thickness range mentioned above includes the thickness of any carrier.

The shoulder 102 also comprises a flange 111 to help minimise slippage of the shoulder 102 relative to the stirring pin 104, as described in more detail later.

The outer radius of the shoulder (measured to the peripheral edge of the flange is 4.5 mm to 75 mm, readily achievable with PCBN material. Likewise, it is achievable from a manufacturing perspective using a backed PCBN disc.

The annular disc 106 comprises a central through-hole or aperture 112, which is tapered outwardly from an upper first surface 114 towards a lower second surface 116. The first and second surfaces 114, 116 of the annular disc 106 are planar and parallel. The orientation of the annular disc 106 is such that the upper first surface 114 is closest to the stirring pin 104 in the assembled condition, and the lower second surface 116 furthest away. The taper of the aperture 112 helps ensure a close coupling of the shoulder 102 about the stirring pin 104. After assembly, the stirring pin 104 protrudes through the aperture 112.

The shoulder 102 comprises a spiral feature 118 machined into the first upper surface 114, as best seen in FIG. 8. The spiral 118 softens metal flow around the stirring pin 104 during FSW.

Figure 9:
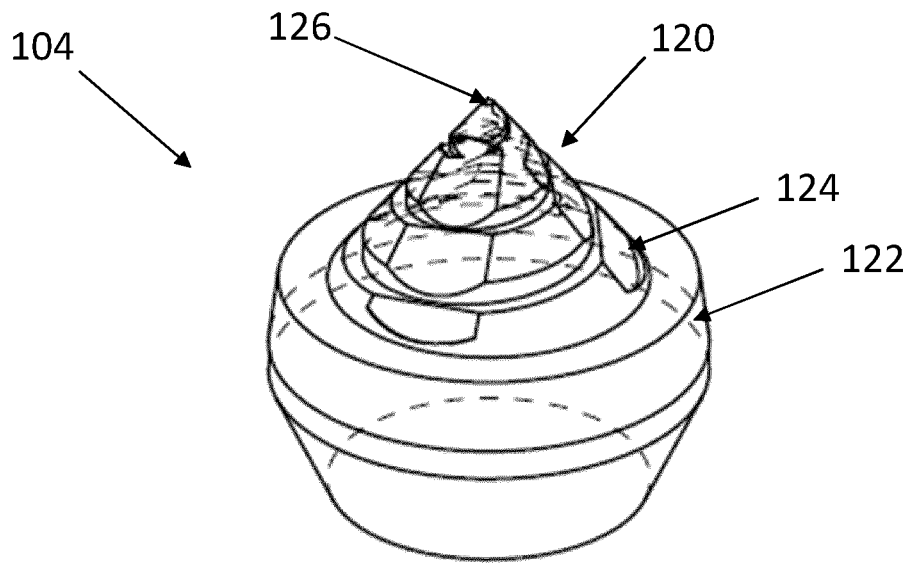
FIG. 9 shows a perspective view of the stirring pin of FIG. 3.
Figure 10:
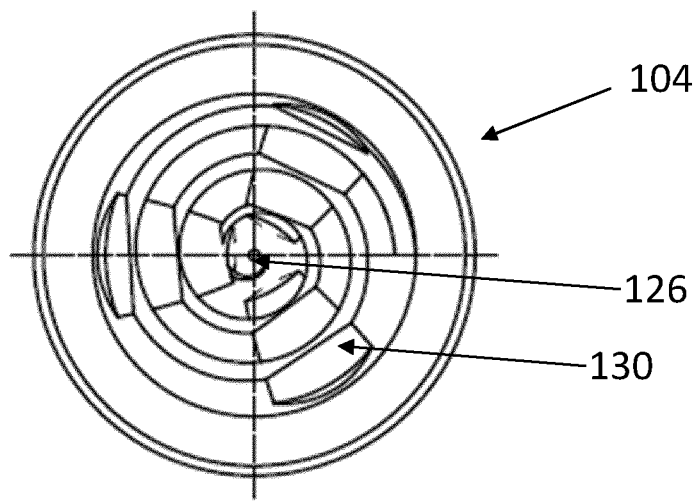
FIG. 10 shows a plan view of the stirring pin of FIG. 9.
Figure 11:
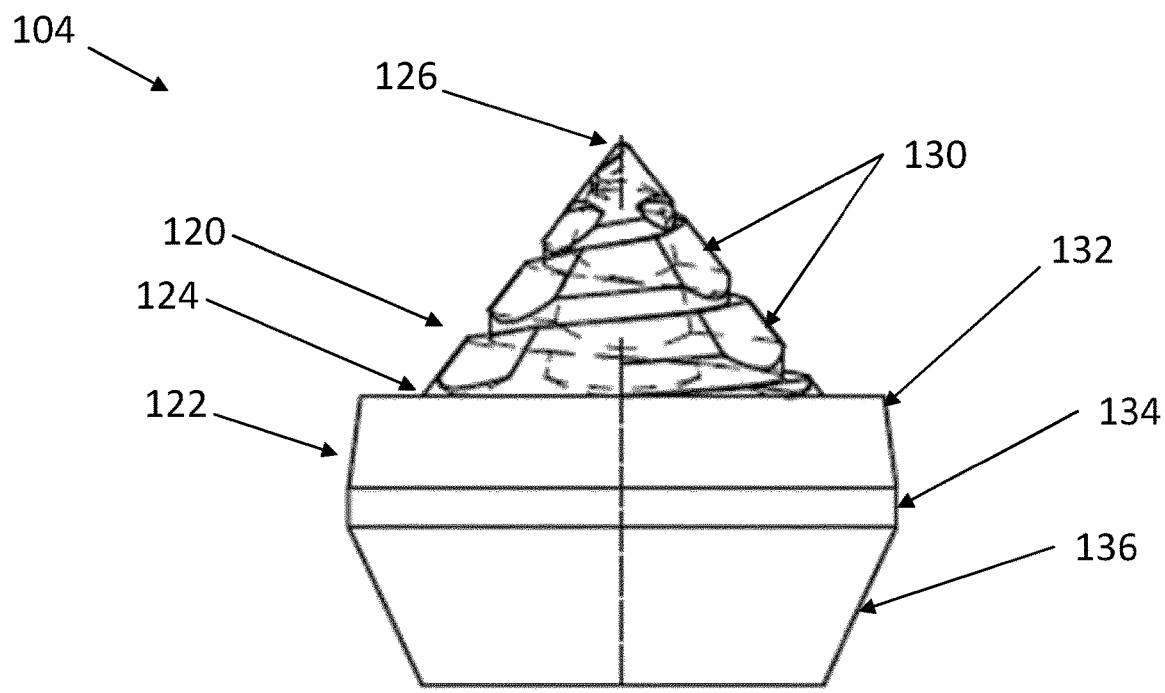
FIG. 11 shows a side view of the stirring pin of FIG. 9.

Turning now to FIGS. 9 to 11, the stirring pin 104 comprises first and second pin portions 120, 122 that meet at a boundary 124. The first pin portion 120 is conical, and extends away from the second pin portion 122 at the boundary 124 towards a pointed apex 126. The first pin portion 120 spirals downward towards the boundary 124, with a planar pathway 128 machined into the outer surface to form a spiral. Several tri-flats 130 are provided as part of the spiral. The diameter of the of the first pin portion 120 at the boundary 124 is less than the diameter of the second pin portion 122 along the same plane such that the first pin portion 120 is stepped radially inwards.

As best seen in FIG. 11, the second pin portion 122 comprises a radially outwardly tapering waist section 132 proximate the boundary 124, the waist section 132 extending into an outwardly tapering middle section 134, the middle section 134 extending into a radially inwardly tapering base section 136. In other words, the waist section 132 is a truncated cone, the middle section 134 is a cylinder, and the base section 136 is a truncated cone, all stacked end-to-end abutting one another but integrally formed. An inner circular surface 138 of the shoulder aperture 112 (see FIG. 7) abuts the waist section 132 when the stirring pin 104 and shoulder 102 are assembled together.

The second pin portion 122 has an outer diameter of up to 50 mm. The outer diameter is measured from the axial centre of the stirring pin 104 to the outermost surface. In this embodiment, the greatest diameter is found at the middle section 134. Preferably, the second pin portion 122 has an outer diameter of 25 mm to 50 mm. The shoulder aperture 112 is sized correspondingly.

The stirring pin 104 comprises PCBN and is formed as a single piece. The stirring pin 104 is machined out of a monolithic PCBN block after the block has been sintered. Any suitable machining technique may be used, for example, using lasers.

Figure 12:
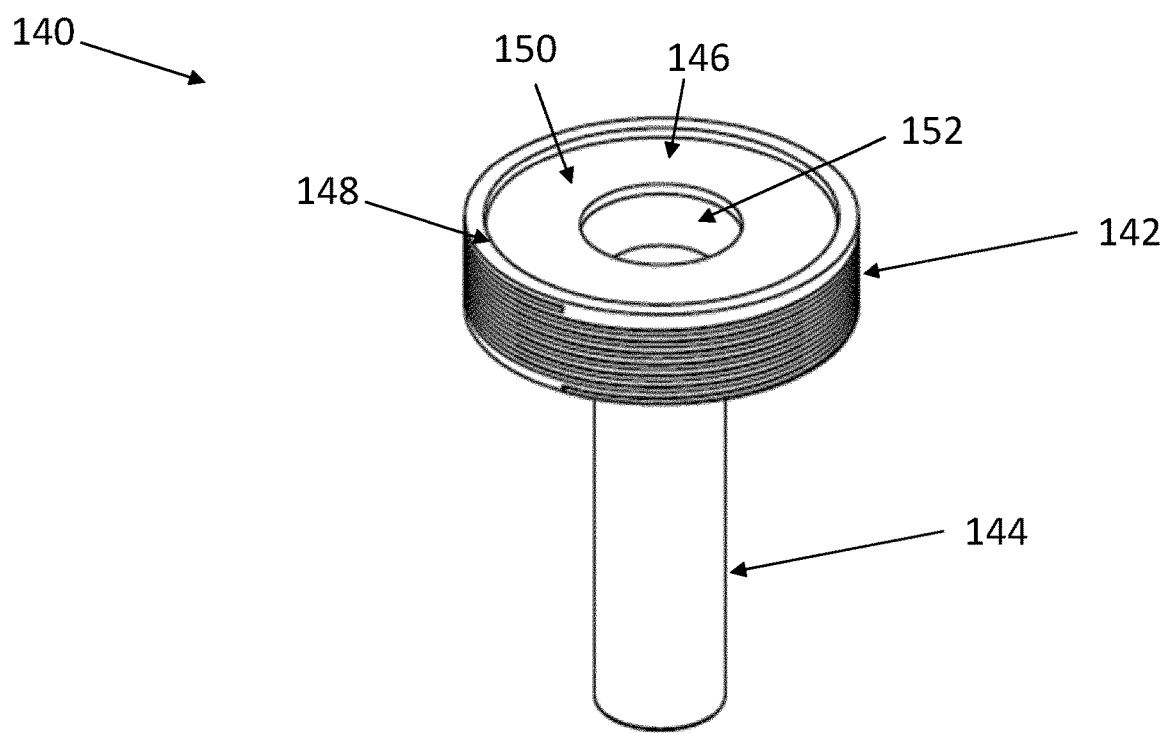
FIG. 12 shows a perspective view of a tool holder to couple with the tool insert of FIG. 3.
Figure 13:
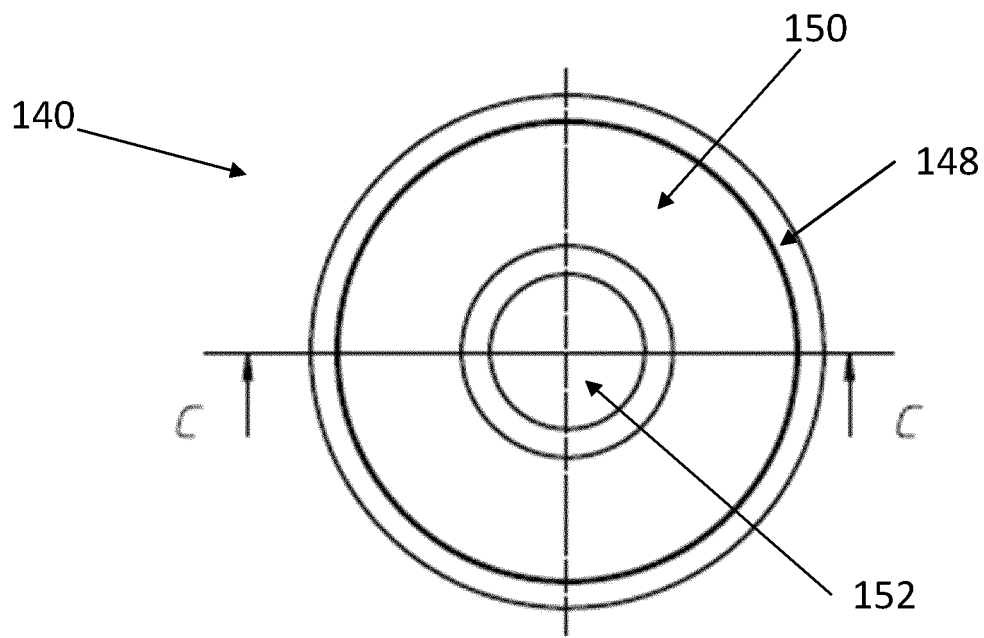
FIG. 13 shows a plan view of the tool holder of FIG. 12.
Figure 14:
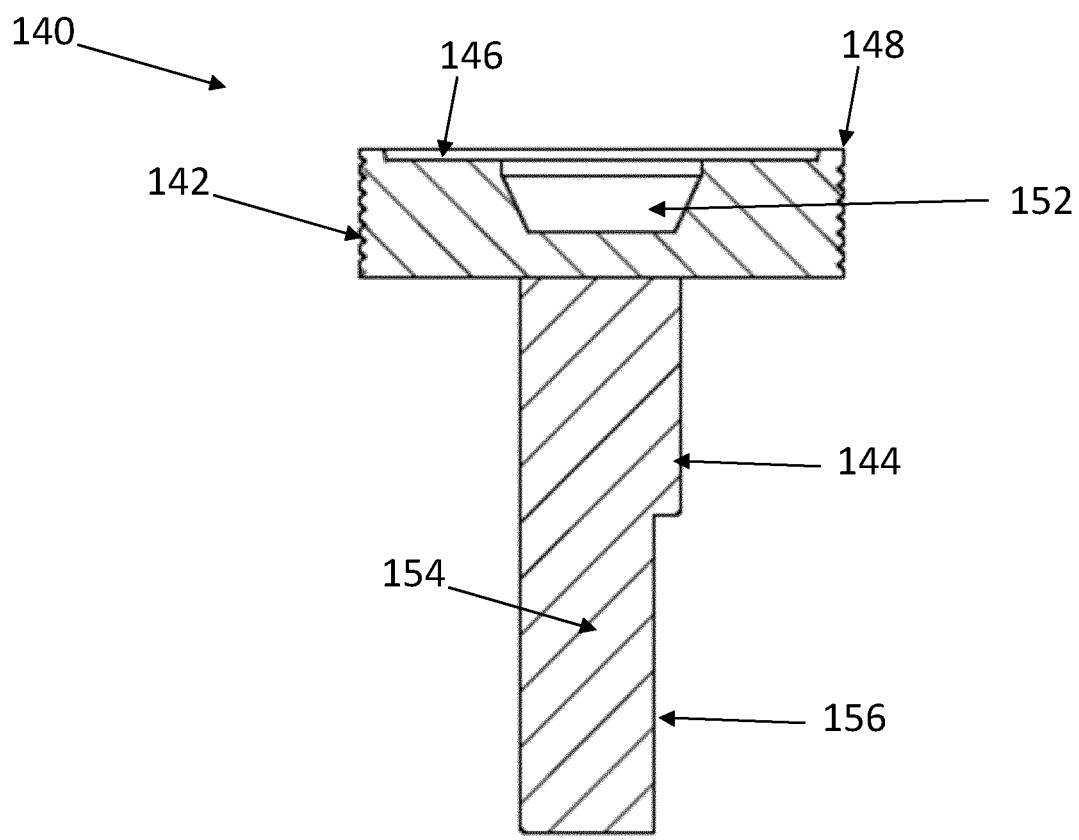
FIG. 14 shows a cross-sectional view through section C-C shown in FIG. 13.
Figure 15:
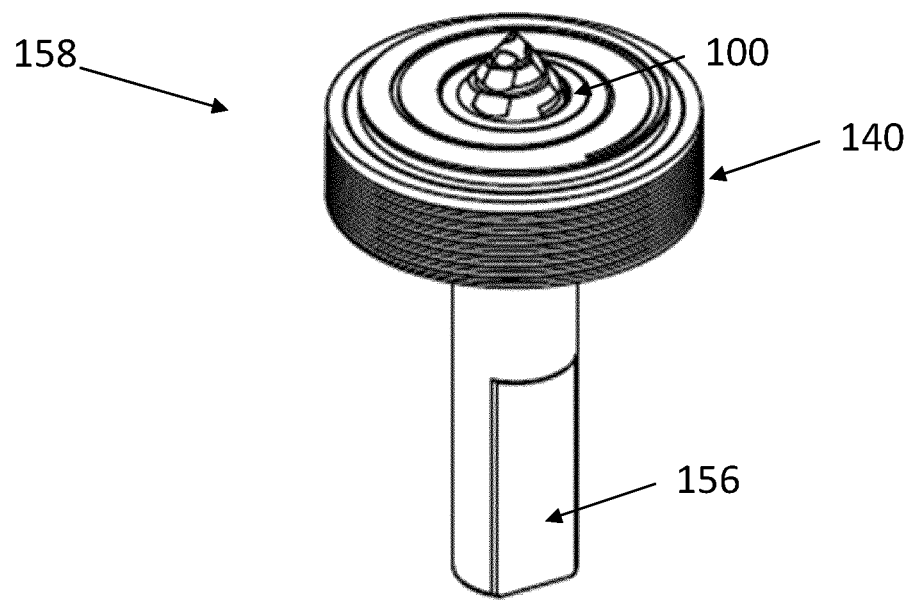
FIG. 15 shows a perspective view of a tool assembly comprising the tool insert of FIG. 3 and the tool holder of FIG. 12.
Figure 16:
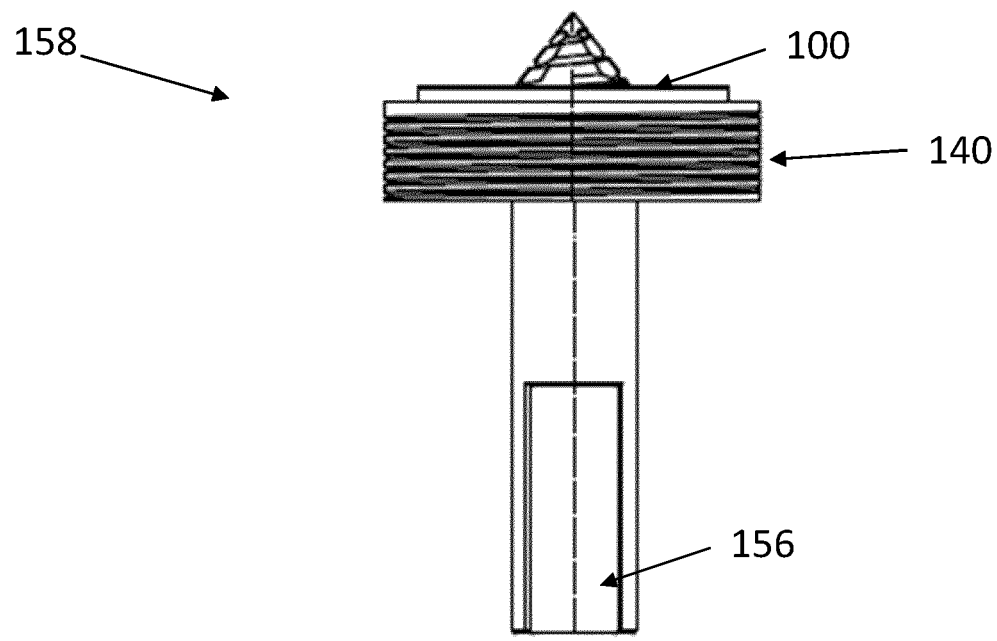
FIG. 16 shows a side view of the tool assembly of FIG. 15.
Figure 17:
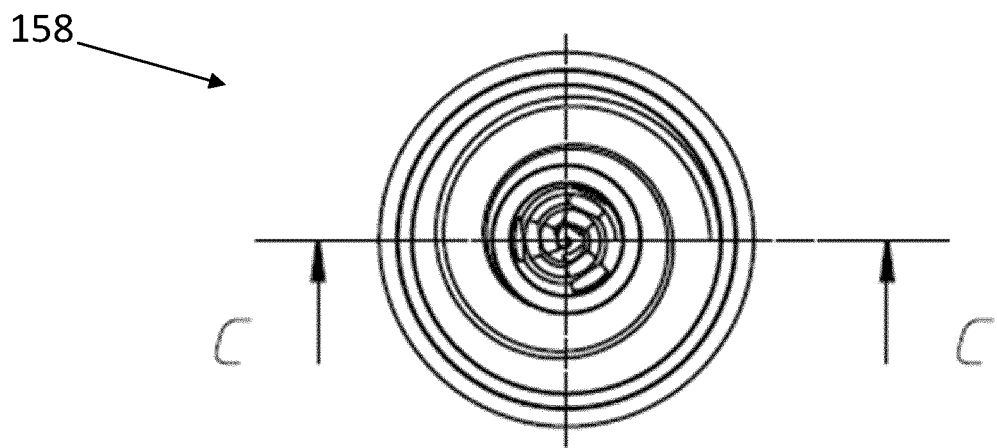
FIG. 17 shows a plan view of the tool assembly of FIG. 15.
Figure 18:
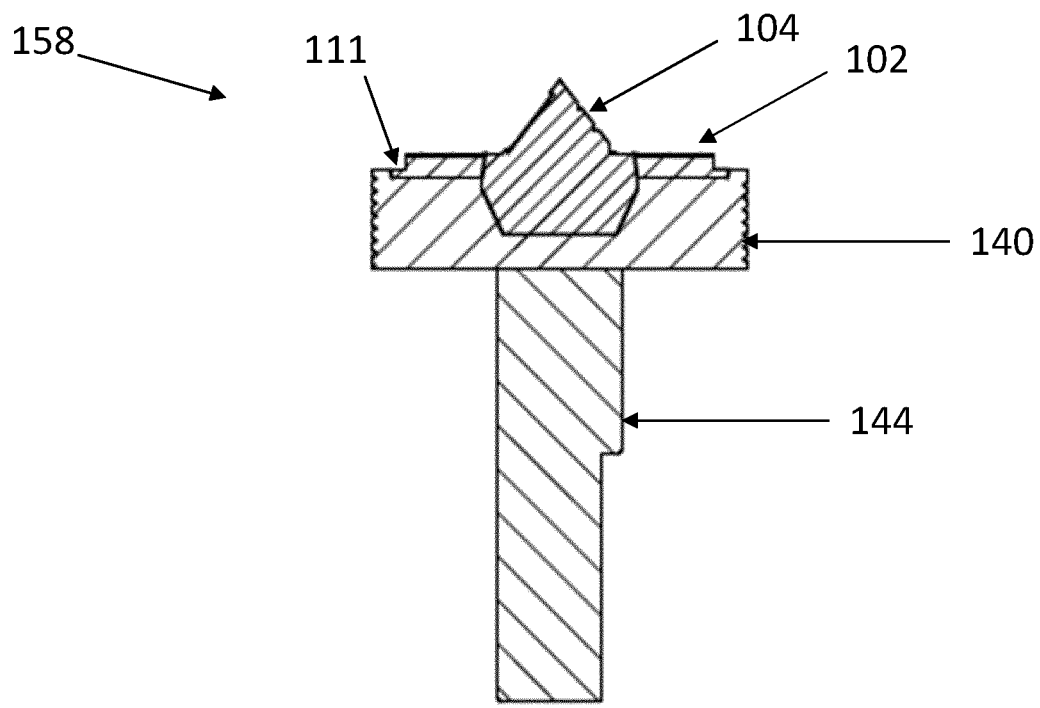
FIG. 18 shows a cross-sectional view of the tool assembly through section C-C shown in FIG. 17.

FIGS. 12, 13 and 14 focus on a tool holder indicated generally at 140. The purpose of the tool holder 140 is to support the tool insert 100 during the FSW operation.

The tool holder 140 comprises a holding member 142 for receiving the tool insert 100, and an elongate trunk member 144 joined to the holding member 142, as shown in FIG. 12.

Figure 19:
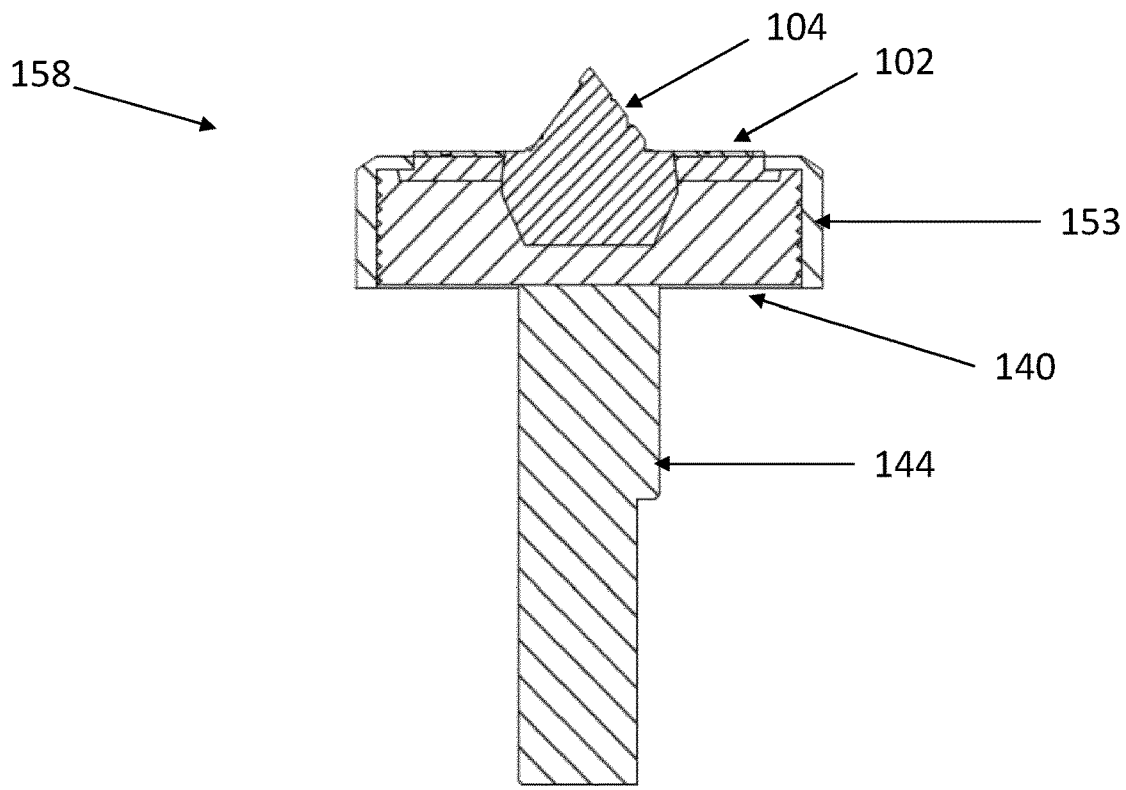
FIG. 19 shows a cross-sectional view of the tool assembly through section C-C shown in FIG. 17 and with a retaining nut mounted about the tool holder.

The holding member 142 comprises a shallow circular recess 146 to at least partially receive the shoulder 102—see FIG. 12. The circular recess 146 forms a circumferentially extending rim 148 bounding a planar contact surface 150. The holding member 142 further comprises a flat-bottomed cup 152 to receive the tool insert 100. The cup 152 is set into the circular recess 146, and is located centrally. The cup 152 is configured to receive only the base section 136 and the middle section 134 of the stirring pin 104. The holding member 142 is externally threaded to receive a retaining nut 153 as shown in FIG. 19.

The trunk member 144 comprises a cylindrical body 154 and a tool flat 156 for connecting to a FSW machine in a conventional manner.

The tool holder 140, or at least the holding member 142, comprises a nickel-based alloy. Nimonic® 80A alloy is preferable.

Turning now to FIGS. 15 to 19, a tool assembly is indicated generally at 158. The tool assembly 158 comprises the tool insert 100 and the tool holder 140 described above.

When the tool assembly 158 is in an assembled condition, the lower second surface 116 of the shoulder 102 faces and is contiguous the contact surface 150 of the holding member 142. The rim 148 at least partially bounds the shoulder 102 to keep it in place, thereby preventing any lateral movement. The base and middle sections 134, 136 of the stirring pin 104 fit snugly within the recessed cup 152. The retaining nut 153 helps secure the shoulder 102 within circular recess 146 by extending laterally over the flange 119 of the shoulder 102.

The tool assembly 158 may comprise cooperating locking elements 160 on the tool holder 140 and the shoulder 102. Some of the cooperating locking elements are provided on the contact surface 150 of the tool holder 158. The remaining cooperating locking elements 160 would be located on the lower second surface 116 of the shoulder 102.

Figure 20:
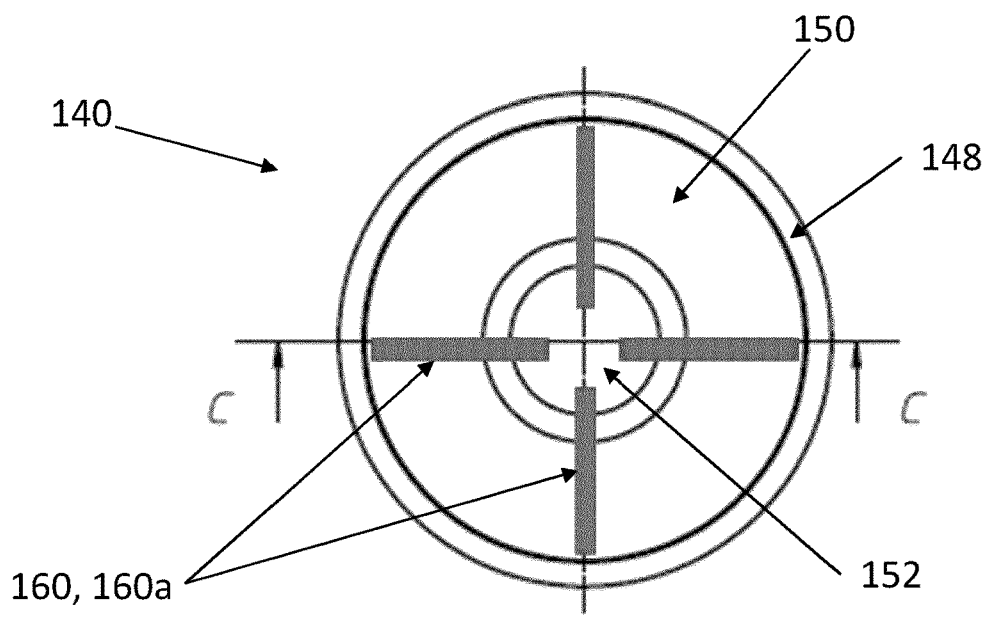
FIG. 20 shows a plan view of an alternative tool holder, and in particular, a first embodiment of cooperating locking elements.

For example, in FIG. 20, the cooperating locking elements 160 comprise four ribs 160a that extend radially from the centre of the tool holder 140 towards the rim 148. Four correspondingly shaped recesses are provided on the lower second surface 116 of the shoulder 102. The ribs 160b fit into the recesses, locking the shoulder 102 and tool holder 140 together to prevent relative rotation therebetween. The cooperating locking elements 160 thus play an anti-rotation role.

Figure 21:
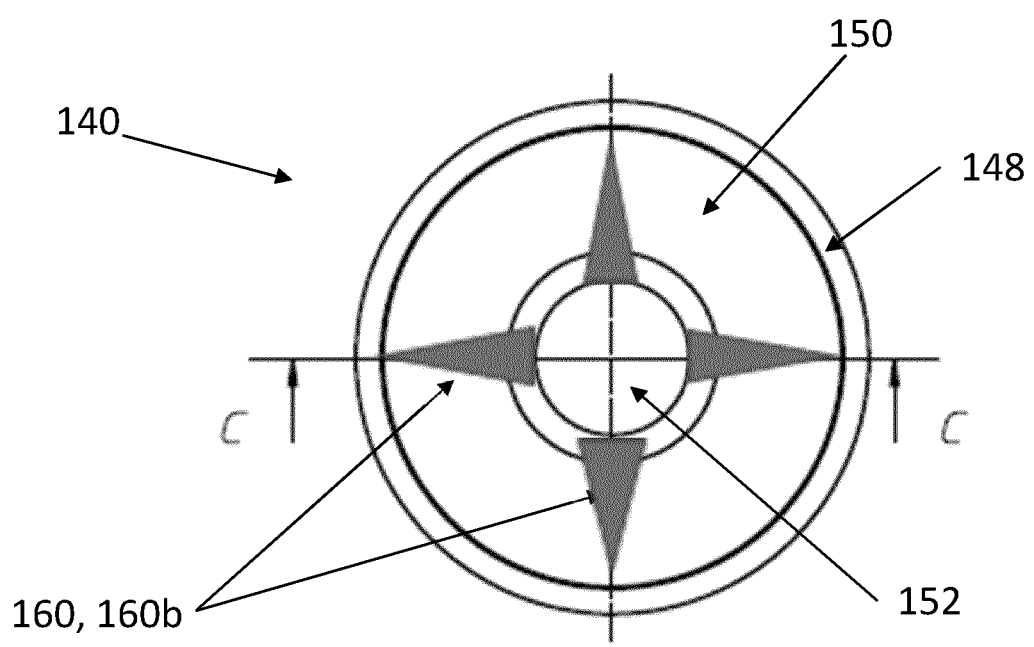
FIG. 21 shows a plan view of yet another alternative tool holder, and in particular, a second embodiment of cooperating locking elements.

Similarly, in FIG. 21, the cooperating locking elements 160 comprise four ridges 160b that are triangular in plan view. Again the ridges 160b extend radially from the centre of the tool holder 140 towards the rim 148, from a base of the triangle to a point. Four correspondingly shaped recesses are provided on the lower second surface 116 of the shoulder 102.

The cooperating locking elements 160 may alternatively comprise circular protrusions or 'dimples' and correspondingly shaped recesses.

Other forms are envisaged, e.g. a manmade textured surface sufficient to prevent rotation.

Whilst it has been suggested that the ribs, ridges and circular protrusions are located on the tool holder 140 and the recesses on the shoulder 102, they may alternatively be arranged on the shoulder 102 and the recesses located on the tool holder 140.

The cooperating locking elements 160 need not be numerous in quantity. A single set of cooperating locking elements 160 would suffice, e.g. one large rib and a correspondingly shaped recess.

In brief, the inventors have found that by providing the PCBN tool insert in two pieces, it is possible to manufacture a 'large-scale' PCBN tool insert that is capable of welding plates with a thickness greater than 12 mm and hitherto unachievable. Costs are minimised by using only a relatively thin disc as the shoulder and not a larger solid block.

While this invention has been particularly shown and described with reference to embodiments, it will be understood by those skilled in the art that various changes in form and detail may be made without departing from the scope of the invention as defined by the appended claims.

The invention claimed is:

1. A friction stir welding (FSW) tool insert having a longitudinal axis of rotation, said tool insert comprising:
    a stirring pin; and
    an annular shoulder coaxially mounted about the stirring pin, the stirring pin and annular shoulder each comprising polycrystalline cubic boron nitride,
    wherein the annular shoulder is a thin disc with a thickness of 1 to 12 mm and wherein the shoulder comprises a tapered, central aperture, through which the stirring pin protrudes,
    wherein the stirring pin comprises a conical first pin portion extending away from a second pin portion at a boundary, towards an apex, wherein the second pin portion
    comprises an outwardly tapering waist section proximate the boundary, the waist section extending into an outwardly tapering middle section, the middle section extending into an inwardly tapering base section.

2. The FSW tool insert according to claim 1, in which the disc has a thickness of 2 to 12 mm.

3. The FSW tool insert according to claim 1, in which the shoulder comprises a carbide carrier or in which the shoulder is unbacked by any carrier.

4. The FSW tool insert according to claim 1, in which the shoulder comprises at least one spiral feature on a planar upper surface, the upper surface being proximate to the stirring pin.

5. The FSW tool insert according to claim 1, in which the shoulder has an outer radius of 4.5 mm to 75 mm.

6. The FSW tool insert according to claim 1, in which the shoulder further comprises a flange.

7. The FSW tool insert according to claim 1, the stirring pin further comprising stir inducing topographical features provided in or on the first pin portion and/or the second pin portion, in which the stir inducing topographical features are spirals and/or flats.

8. The FSW tool insert according to claim 1, in which the second pin portion has an outer diameter of up to 50 mm.

9. The FSW tool insert according to claim 1, in which the second pin portion has an outer diameter of 25 mm to 50 mm.

10. A tool assembly comprising a tool holder and the FSW tool insert according to claim 1, the tool holder comprises a holding member for receiving the tool insert, and an elongate trunk member joined to the holding member.

11. The tool assembly according to claim 10, in which the holding member comprises a recessed cup to receive the tool insert.

12. The tool assembly according to claim 10, in which the holding member is configured to receive only the base section of the stirring pin within the recessed cup.

13. The tool assembly according to claim 10, in which a lower planar surface of the shoulder abuts the tool holder in an assembled condition.

14. The tool assembly according to claim 10, wherein:
    an inner circular surface of the shoulder abuts the waist section of the stirring pin in an assembled condition.

15. The tool assembly according to claim 10, in which the tool holder comprises a nickel-based alloy.

16. The tool assembly according to claim 10, further comprising a retaining nut mounted about the shoulder and the tool holder.

17. The tool assembly according to claim 10, further comprising a set of cooperating locking elements to prevent relative rotation between the shoulder and the tool holder.

18. The tool assembly according to claim 17, comprising a plurality of sets of cooperating locking elements.

* * * * *